Jan. 1, 1957     C. O. BRUESTLE     2,776,097
WIRE CLAMP

Filed Aug. 19, 1953     2 Sheets-Sheet 1

INVENTOR.
Carl O. Bruestle
BY
HIS ATTORNEYS.

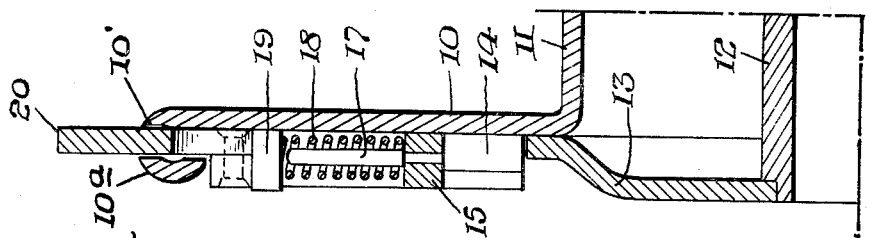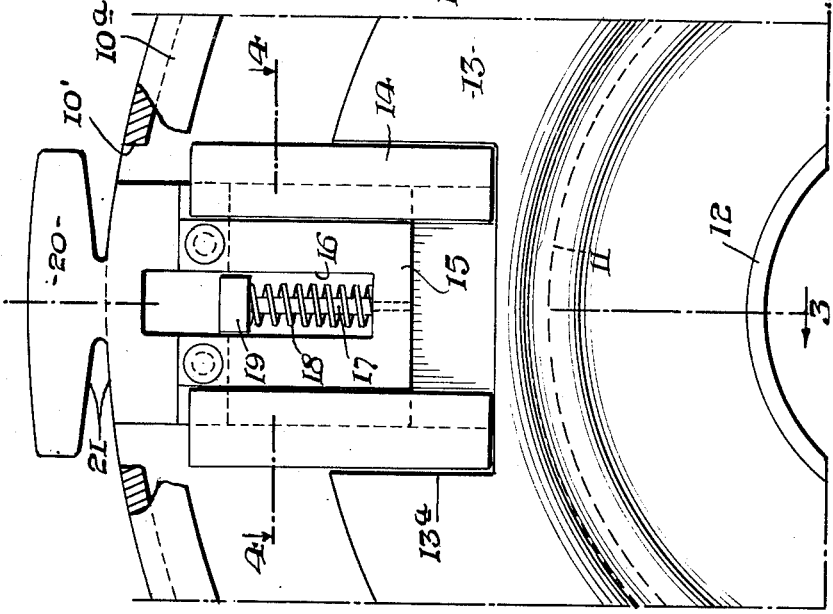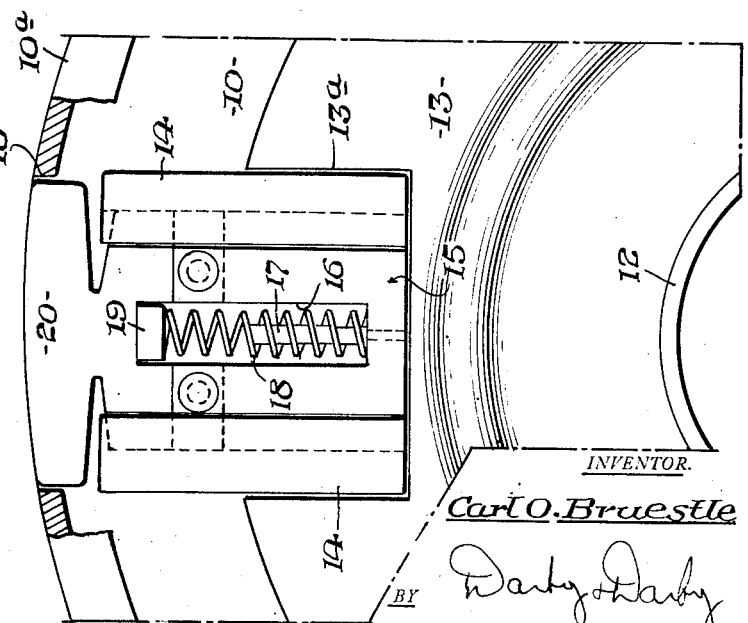

United States Patent Office 2,776,097
Patented Jan. 1, 1957

2,776,097

WIRE CLAMP

Carl O. Bruestle, Metuchen, N. J., assignor to Syncro Machine Company, Perth Amboy, N. J., a corporation of New Jersey Application August 19, 1953, Serial No. 375,206

2 Claims. (Cl. 242—125)

This invention is for a wire clamp for use on a spool and is arranged to be automatically projected by centrifugal force for the purpose of clamping the end of a wire at the end of spooling, and further characterized by structure which causes it to be retracted within the rim periphery of the spool when not in use.

The wire clamp herein disclosed is of the type described in detail in my United States Patent No. 2,600,841, granted June 17, 1952, for Wire Clamp and Cutter for Spooling Machines.

The wire cutter and clamp herein disclosed differs from that described in my above patent in that it is incorporated as a permanent part of the spool as distinguished from the clamps of that patent which are detachably mounted on the spool during spooling.

An object of this invention is to provide a wire clamp and cutter of this general type which can be permanently mounted on the spool, is projected radially by centrifugal force during spooling to perform the severing and clamping functions, and is spring returned within the periphery of the spool when the clamped end of the wire is removed therefrom.

A broader object of the invention is to provide a device of this type which will not interfere with the normal rolling of the spool about during processing, storage and transportation.

The more detailed objects of the invention will be apparent from the following disclosure of the embodiment thereof illustrated in the attached drawings.

In these drawings,

Figure 2 is an enlarged detail elevational view showing the clamp structure with some parts of the spoolhead rim broken away;

Figure 3 is a cross-sectional view taken on the line 3—3 of Figure 2;

Figure 4 is a cross-sectional view taken on the line 4—4 of Figure 2;

Figure 5 is a view similar to Figure 2 with the clamp retracted as distinguished from its projected position in Figure 2.

Figure 1:
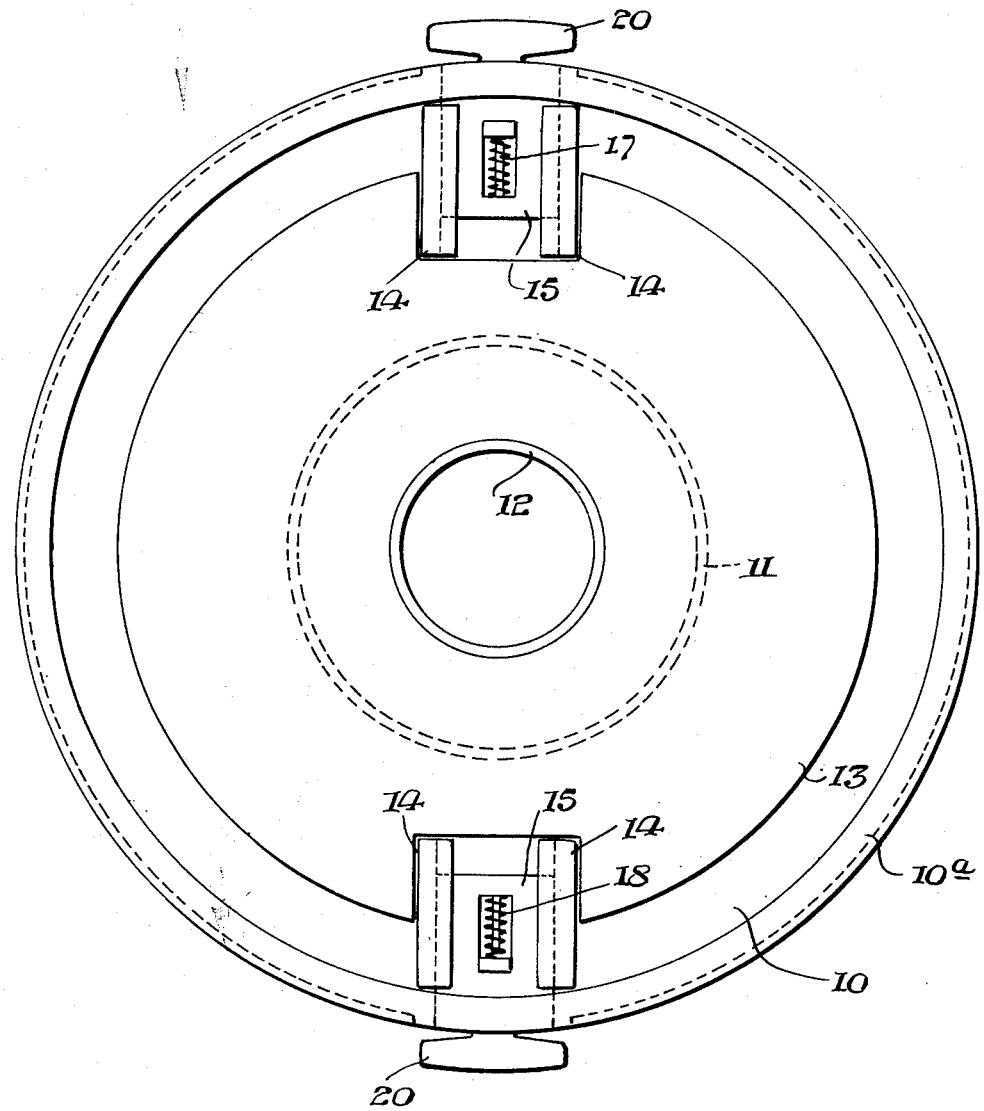
Figure 1 is a side elevational view of a spool having a pair of the clamps of this invention permanently mounted on one of the spoolheads.

In the continuous spooling of wire, machines have been devised such as that disclosed in my above mentioned patent whereby when one spool is full the wire is traversed into position to be wound upon an adjacent empty spool, and there is associated with such mechanism wire severing and clamping lugs arranged to sever the wire between the spools and clamp the two ends thus formed. The clamped end of the full spool is thereby prevented from being a hazard and from damaging the wire, and the clamped end for the empty spool is held to facilitate initial spooling of the wire.

The main purpose of this invention is to provide severing and clamping devices of this kind which can be permanently incorporated as a part of the spool without interfering with the usual method of rolling the spool about whether empty or full.

In the drawings a particular spool structure is shown, but those skilled in the art will appreciate that, as the disclosure proceeds, this invention is not limited in its application to the particular form of spool illustrated. The spool as shown is a built-up metal spool comprising a pair of disc-like spoolheads 10 provided with an axially extending tubular core piece 11 which may be integral with or separate from the spoolheads and secured thereto in any suitable manner as by welding. This spool structure is strengthened by means of central offset disc portions 13 which are provided with an arbor core 12, shown in this case as a separate member, which may be welded to the bracing discs 13. The discs may also be welded to the spoolheads or otherwise secured thereto. As is common, the spoolheads 10 have their peripherial edges beaded over, as indicated at 10$^a$, to strengthen them.

In accordance with this invention the periphery of the strengthening disc 13 is provided with a pair of rectangular recesses 13$^a$, see Figure 2, diametrically opposed. Secured in the recesses against the outer face of the spoolhead at each of the recesses are a pair of guides or jibs 14, secured thereto in parallel spaced relation in any suitable manner, as for example by welding. Slidably mounted in the guideway thus formed is a plate 15 which has a central aperture 16 in which is mounted a pin 17. Secured to the spoolhead so as to lie in the slot or recess 16 is a stop 19 which is radially aligned with the pin 17 and against which one end of a spring 18 is seated. The other end of the spring is seated at the base of the slot 16.

Forming part of, or as shown secured to the plate 15 is a wire cutting and clamping head 20 which is provided with a pair of circumferentially aligned, oppositely facing divergent slots 21. This head is in the illustrated case shown attached, as by riveting, to the plate 15. The rim 10$^a$ of the spoolhead is provided with a rectangular opening 10' of suitable size and shape to permit the radial inward and outward movement of the head 20 therethrough. The parts are so proportioned and positioned that when the severing and clamping head 20 is fully retracted, as shown in Figure 5, its outer peripherial edge will coincide with or lie slightly inside of the outermost peripherial edge of the associated spoolhead. The parts are held in this position by means of the spring 18. As illustrated in Figure 1, a pair of these clamping heads may be used or an additional number may be employed, as conditions require.

It will be apparent to those who are familiar with the construction and function of spooling devices of which that illustrated in the above mentioned patent is an example, that when the spool of this invention is mounted on an arbor and loaded for spooling wire thereon, the heads 20 will be forced radially outwardly by centrifugal force from the position shown in Figure 5 to the position shown in Figure 2. When the wire is crossed over from the full spool to an empty spool due to the relative angular speeds of rotation, it will be jammed in one of the converging slots 21, depending upon the direction of rotation of the spool and will be therein as the wire is severed. When the spool is brought to rest all of the clamping devices which do not hold the wire will be retracted by their springs to the position shown in Figure 5, while the one holding the wire will remain in the position shown in Figure 2. When the spool is removed from the machine, the clamped end is removed from the clamping head and secured in more suitable manner, whereupon that head will be retracted to projected position by the spring 18. It will be noted that the pin 17 acts as a stop to limit outward radial movement of the slide and clamping head under centrifugal force.

With all of the clamping devices retracted it will be clear that the spool can be rolled about in the usual manner without damaging the clamping device and without interfering with the smooth rolling of the spool. It is obvious that an advantage of a structure of this kind over that in my above mentioned patent is that the clamping devices are always present and require no special operations to put them in use during spooling.

Those skilled in the art will understand that the invention is capable of detailed modification and I prefer to be limited only as required by the appended claims.

What is claimed is:

1. In a device as described, the combination with a strand spool having a central drum and a pair of substantially disc-like spool heads attached to the respective ends of the drum, a strand clamping member having a converging clamping slot, means on one of said spool heads for supporting said clamping member for radial movement thereon, and resilient means normally holding said clamping member in retracted position within the peripherial outline of the associated spool head, said resilient means being proportioned so that the clamping member under centrifugal force during spooling will project radially to expose said clamping slot.

2. In the combination of claim 1, the edges of said member defining said slot being sharpened to provide a strand cutter.

References Cited in the file of this patent
UNITED STATES PATENTS

| | | |
|---|---|---|
| 696,413 | Dalrymple | Apr. 1, 1902 |
| 766,936 | De Roseau | Aug. 9, 1904 |
| 1,988,437 | Brillhart et al. | Jan. 22, 1935 |
| 2,025,890 | Payne | Dec. 31, 1935 |
| 2,420,594 | Hall | May 13, 1947 |